United States Patent [19]

van der Lely et al.

[11] Patent Number: 4,532,999
[45] Date of Patent: Aug. 6, 1985

[54] SOIL CULTIVATING MACHINE

[75] Inventors: Ary van der Lely, Maasland; Cornelis J. G. Bom, Rozenburg, both of Netherlands

[73] Assignee: C. van der Lely N.V., Netherlands

[21] Appl. No.: 474,668

[22] PCT Filed: Jul. 2, 1982

[86] PCT No.: PCT/NL82/00022
§ 371 Date: Mar. 2, 1983
§ 102(e) Date: Mar. 2, 1983

[87] PCT Pub. No.: WO83/00075
PCT Pub. Date: Jan. 20, 1983

[30] Foreign Application Priority Data

Jul. 3, 1981 [NL] Netherlands .......................... 8103195

[51] Int. Cl.³ ....................... A01B 33/06; A01B 49/02
[52] U.S. Cl. ......................................... 172/68; 403/97; 403/100
[58] Field of Search .................. 172/49.5, 68; 403/87, 403/107, 98, 97, 100

[56] References Cited

U.S. PATENT DOCUMENTS

| 3,616,862 | 11/1971 | Lely | 172/49.5 |
| 3,902,560 | 9/1975 | Lely | 172/49.5 |
| 4,003,438 | 1/1977 | Lely | 172/49.5 |
| 4,016,933 | 4/1977 | Lely | 172/49.5 |
| 4,051,904 | 10/1977 | Lely | 172/49.5 |
| 4,113,024 | 9/1978 | Lely | 172/68 |
| 4,280,565 | 7/1981 | Lely | 172/548 |
| 4,375,837 | 7/1983 | Lely | 172/68 |

FOREIGN PATENT DOCUMENTS 2042313 9/1980 United Kingdom .................. 172/68

Primary Examiner—Richard J. Johnson
Attorney, Agent, or Firm—Penrose Lucas Albright

[57] ABSTRACT

A soil cultivating machine comprising soil cultivating members which are rotated about upwardly extending axes and carried by a gear box which extends transversely of the intended direction of operative travel whereas behind the cultivating members a supporting roller is provided that is vertically adjustable on the gear box by means of carrying arms. Legal provisions in force in various countries limit the maximum widths of the machine for highway travel, for example, to three meters. The gear box can be limited to the prescribed dimension, by, at least at one end of the gear box, providing an end plate which extends above the gear box and pivotally engaging on the inboard side thereof a carrying arm for the roller. In this manner the outer surfaces of the two end plates for the gear box are exactly at a relative distance corresponding to the maximum width allowed while at the same time there is no sacrifice in the width along the gear box required for connecting the roller.

14 Claims, 5 Drawing Figures

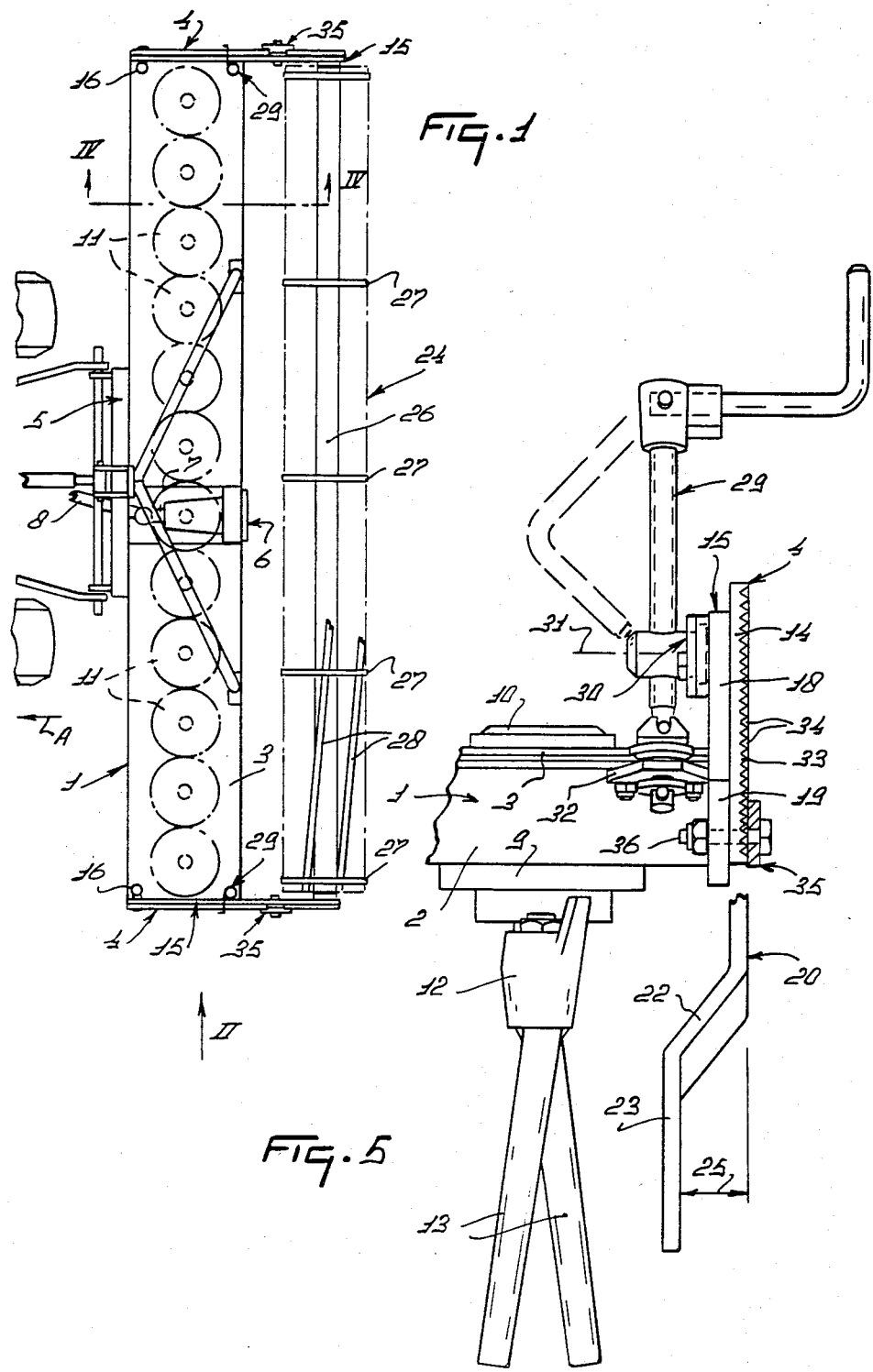

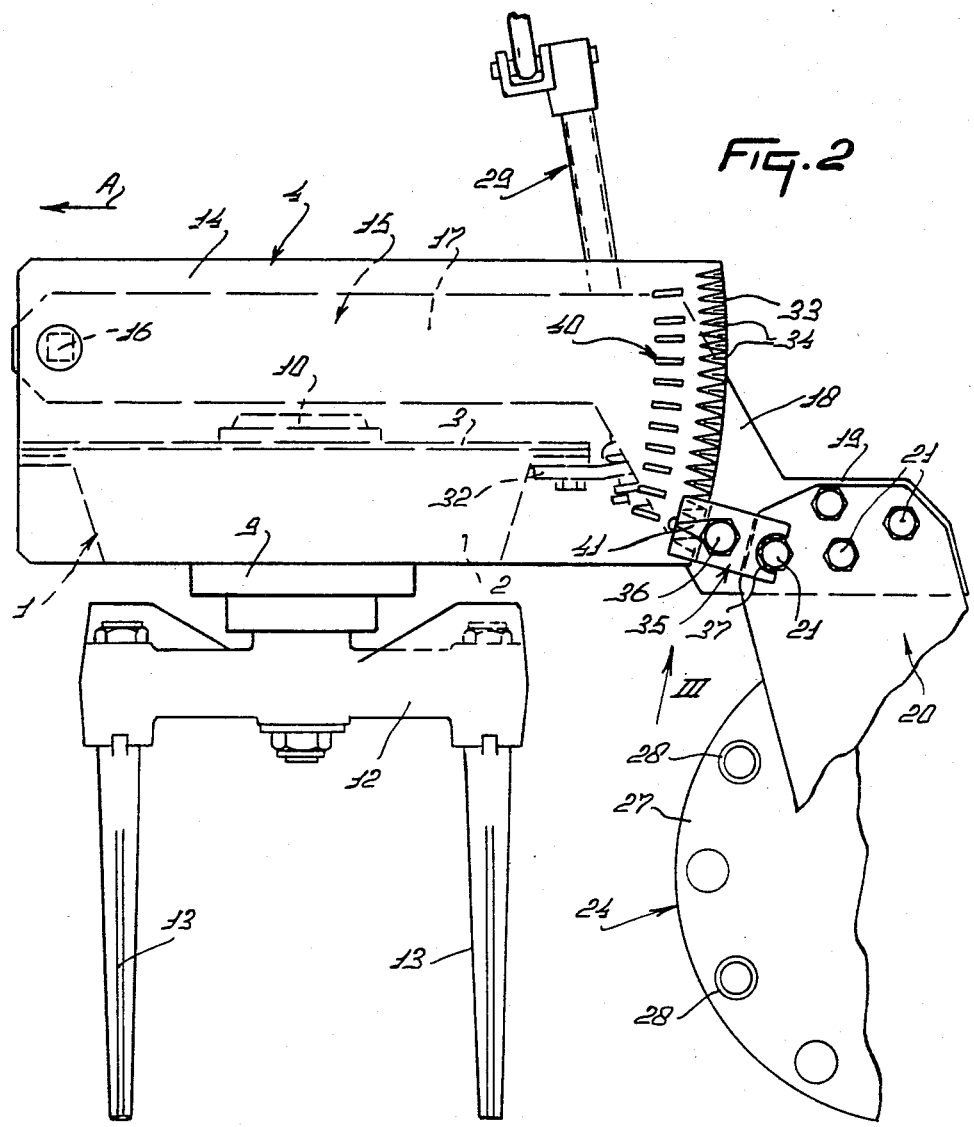
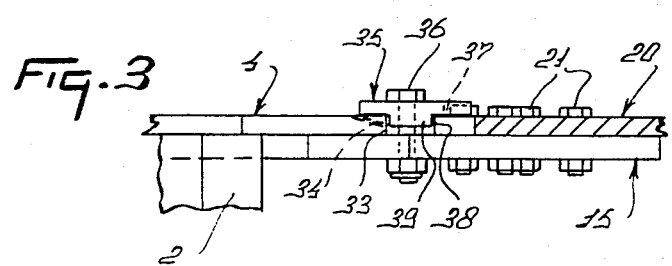

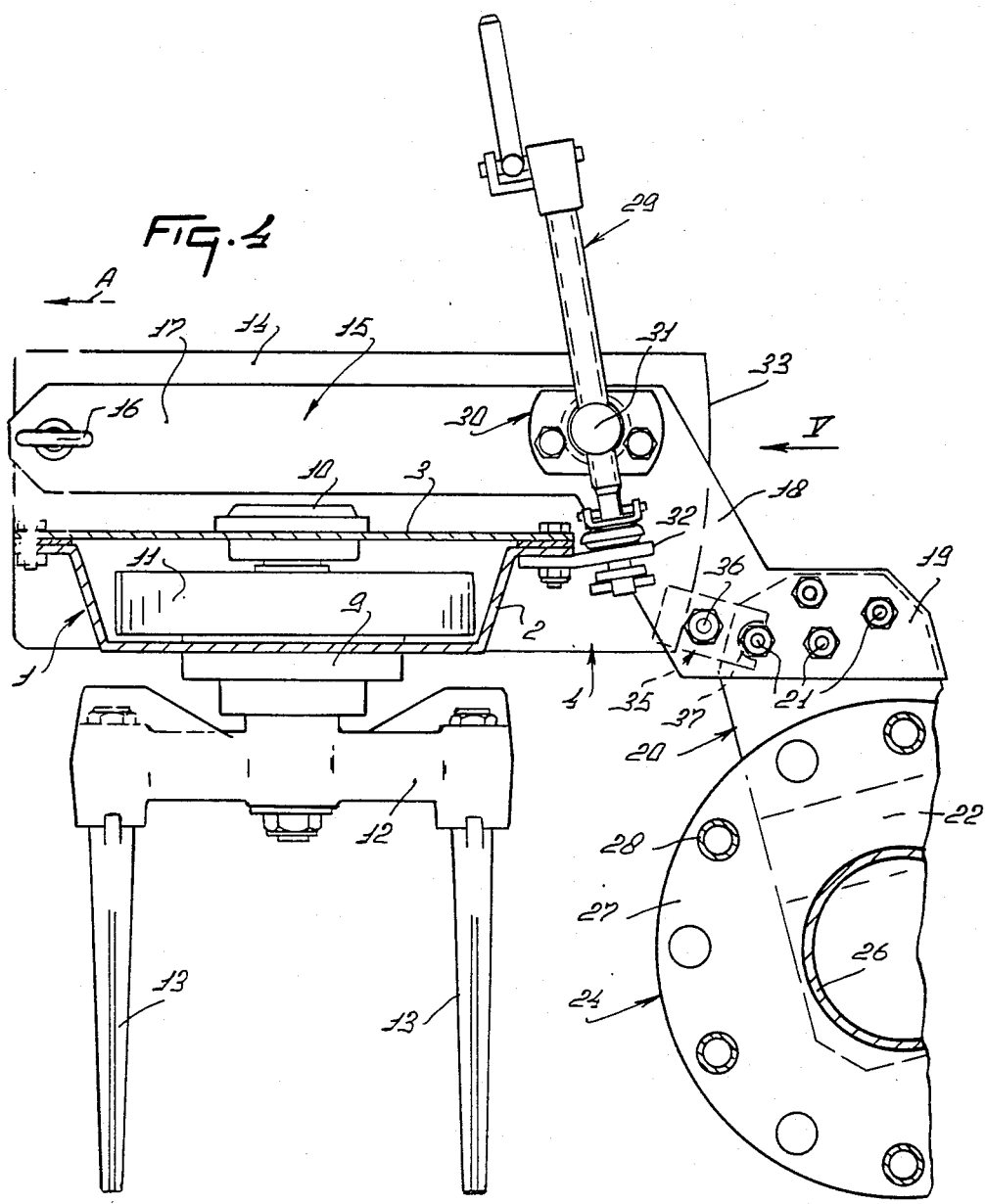

SOIL CULTIVATING MACHINE

SUMMARY OF THE INVENTION

This invention relates to a soil cultivating machine comprising soil cultivating members driven rotatably around upwardly extending axes and being carried by a gear box extending transversely of the intended direction of operative travel and behind the cultivating members a roller which is adjustable in a direction of height on the gear box by means of supporting arms.

During road transport the legal provisions in force in various countries have to be satisfied, according to which provisions the maximum width of the machine should not exceed a given number of meters, for example, three meters. By employing a construction embodying the invention, the gear box can now have a length corresponding to the prescribed dimension. Thus at least at one end of the gear box, and end plate which includes a part extending above the gear box is fastened, while a supporting arm for the roller is arranged to pivot from said part and to be selectively secured on the inboard side of the end plate. In this manner the outer surfaces of the two end plates are exactly at a relative distance corresponding to the maximum width allowed, for example, three meters, without sacrificing the width is sacrificed for suspending the roller.

For a better understanding of the invention and to show how the same may be carried into effect, reference will be made, by way of example, to the accompanying drawings, in which:

BRIEF DESCRIPTION OF THE DRAWINGS

FIG. 1 is a plan view of a machine embodying the invention,

FIG. 2 is a side elevation in the direction of the arrow II in FIG. 1,

FIG. 3 is an elevational view taken in the direction of the arrow III in FIG. 2 of part of FIG. 2, FIG. 4 is a sectional view taken on the line IV—IV in FIG. 1, and FIG. 5 is a rear view in the direction of arrow V in FIG. 4.

DESCRIPTION OF THE PREFERRED EMBODIMENT

The device illustrated in the figures is a soil cultivating machine comprising a frame part 1 extending transversely of the intended direction of operative travel A of the machine and having the shape of a closed box formed from metal sheets. It will be apparent from FIG. 4 that the frame part 1 comprises a substantially U-shaped part 2, the two limbs of which extend upwardly, said part being closed at the top by a detachable cover 3 fastened by bolts and occupying a substantially horizontal position covering the whole width of the machine. The frame part 1 is closed at both ends by a head partition 4 comprising a metal end plate welded along the whole length of the head periphery of the U-shaped part 2. The plate 4 is arranged in a substantially vertical position and is approximately parallel to the direction of movement A. Midway along the length of the frame part 1, a trestle 5 is fastened principally to the top of said frame part, said trestle having, at the front of the machine, three connecting points intended to be coupled with the arms of a three-point lifting device of a tractor moving the machine. Near the mid-point of the frame part 1, the top side thereof is furthermore provided with a driving mechanism 6 having a forwardly protruding input shaft 7 which can be coupled, with the aid of an intermediate shaft 8, to the power take-off shaft of a tractor connected with the trestle 5.

The bottom of the U-shaped part 2 is provided with a sequence of bearing 9 extending transversely of the direction of movement A and the cover 3 has a corresponding sequence of bearing 10 so that the center line of each bearing 9 registers with the center line of a corresponding bearing 10. In the bearings 9 and 10 are rotatably held upwardly extending rotary shafts, which are coaxially surrounded, inside the closed frame part 1, by gear wheels 11, the proportions of the arrangement being such that the gear wheels 11 associated with the two series of bearings 9 and 10 form a sequence of meshing pinions extending transversely of the direction of movement A. A gear wheel 11 located near the driving mechanism 6 can be directly driven from said mechanism and all further gear wheels 11 are rotated by said directly driven gear wheel during operation. In this way the gear wheels 11 constitute an even number of pairs of wheels rotatably driven in opposite directions. The axes of the shafts associated with the gear wheels 11 are preferably spaced apart by a distance of about twenty-five centimeters and protrude from the bottom of the frame part 1. At the lower ends, said shafts have the tine carriers 12 which each project from both sides of the shaft and, near their opposite ends, they carry downwardly extending soil cultivating tines 13. The paths described by the tips of the tines 13 overlap one another. Each carrier 12 and its tines 13 together constitute a soil cultivating member. The frame part 1 thus forms a gear box containing, in addition, the lubricants required for the gear wheel drive.

From FIGS. 2, 4 and 5 it will be apparent that, considered in a direction of height, each head partition 4 is not limited to the top of the cover 3 of the frame part 1 but, by part of its height indicated by the reference numeral 14, it extends above the top surfaces of the frame part 1. The elevational view of FIG. 2 and the sectional view of FIG. 4 shows that the circumference of the head partition 4 is substantially rectangular and, viewed parallel to the direction of travel A, it extends from the front of the frame part 1 to a point at a predetermined distance behind the rear edge of said frame part. As shown in FIGS. 2 and 4, the bottom edge of the head partition 4 approximately coincides with the bottom of the gear box 1. The height by which the part 14 of the head partition 4 extends above the top of the frame part 1 is, in the preferred embodiment, shown to be at least equal to the height of the frame part 1 itself measured in the same direction.

On the inner, vertical boundary surface of the part 14 of the head partition 4, that is to say, the boundary surface of the part 14 facing towards the other end of the frame part 1, a carrying arm 15 is pivotally arranged on a pivotal shaft 16. The pivotal shaft 16 is horizontal, transverse to the direction of travel A and parallel to the frame part 1. Considered with respect to the direction of movement A, the pivotal shaft 16 is arranged near the front of the part 14 of the head partition 4 that extends above the frame part 1. Measured in a direction of height, the pivotal shaft 16 is located approximately midway between the top surface of the frame part 1 and the horizontal top edge of the part 14. The carrying arm 15 is cut from a flat metal sheet or plate and has a part 17 extending rearwardly away from the pivotal shaft 16 and, in the position shown, it is substantially horizontal and at the top and bottom it is bounded by two parallel lines. As seen in the sectional view of FIG. 4, the rear end of the part 17 is located substantially directly behind the rear edge of the frame part 1. This rear end terminates in a downwardly and rearwardly inclined part 18, which has, in the end position shown in FIG. 4, a lowermost boundary point located just below a horizontal plane containing the bottom of the frame part 1. The part 18 then terminates in a part 19 which is directed away from the part 18 substantially horizontally to the rear in the position shown in FIG. 4, while its rear edge extends over a pre-determined distance behind the rearmost boundary line of the part 14. Also the parts 18 and 19 are roughly bounded by relatively parallel edges. The parts 17, 18 and 19 are made from a single piece of metal sheet or plate. In the position shown in FIG. 4, the vertical side face of the part 17 of the carrying arm 15 directed towards the part 14 of the head partition 4 is, throughout its height, in surface to surface engagement with the side face of the part 14 directed towards the carrying arm 15.

To the outer side of the rearmost part 19 of the carrying arm 15 is fastened a support 20 which, in the position of the carrying arm 15 shown in the figures, is rearwardly and mainly downwardly inclined away from the part 19 of the carrying arm 15. The support 20 is fastened to the end part 19 of the carrying arm 15 by bolts 21, the heads of which are located on the outerside of the outermost side face of the support 20. Therefore, the part of the support 20 in engagement with the part 19 is located, viewed in plan, straight behind, or in line with, the part 14 of the head partition 4. From FIG. 5 it will be apparent that the support 20, which may be considered to be part of the carrying arm 15, is located, in the position of the carrying arm 15 shown, approximately at the level of the tine carriers 12 and is bent over in a direction towards the other end of the frame part 1. A bent-over part 22 terminates in a part 23, which, like the top part of the support 20, is again vertical and parallel to the direction of travel A. The lower part 23 of the support 20 has on its outer side a bearing (not shown) for a supporting roller 24 of the machine, said roller being freely rotatable on the support 20 and on a substantially symmetrically disposed support 20 fastened to the other end of the gear box 1. During operation the machine bears on the ground by means of the roller 24. (FIGS. 1, 2 and 4).

The distance, designated in FIG. 5 by a reference numeral 25, between the outer face of the part 23 of the support 20 and a plane coinciding with the outer face of the plate 4 corresponds to the dimension of the aforesaid bearing by which the roller 24 is connected to the support 20, measured in the same direction.

The roller 24 comprises a central, tubular shaft 26, on which annular metal partitions 27 are arranged near both ends and at several places between the two ends, said partitions being coaxial with the shaft 26 (FIG. 1). The partitions 27 are interconnected by a large number of rods or tubes 28, which extends in the direction of the greatest dimension of the roller 24 and which are passed through apertures provided around the circumferences of the partitions 27. The rods 28 extend outwardly over a given distance beyond the two outer-most partitions 27 so that, on each side of the roller 24, their ends are located in a plane intersecting the part 22 of the corresponding support 20 which is bent over towards the center near the inner side surface of the upper part of the support 20 concerned.

Near the rearmost end and immediately inboard of the part 17 of the carrying arm 15 is fastened adjustable securing means comprising a screw spindle 29 journalled in a bearing 30 which is secured to the inner side face of the part 17. The upwardly extending screw spindle 29 is arranged to turn about a pivotal shaft 31 associated with the bearing 30 (FIG. 4), said shaft being directed horizontally and perpendicularly to the vertical side faces of the plate-shaped part 17. The screw spindle 29 extends downwardly through the bearing 30 and is rotatably fastened near its lower end to a supporting plate 32, which is fastened to the rear and outer surfaces of the U-shaped part 2 of the gear box 1, from where it protrudes to the rear.

As will be seen from the elevational view of FIG. 2 and the sectional view of FIG. 4, an upwardly extending rear edge 33 of the plate 4 is rounded off in the form of an arc of a circle. The center of this arc is located on the axis of the pivotal shaft 16. Viewed in plan, the rear edge 33 is located substantially midway between the rear edge of the gear box 1 and the longitudinal axis of the roller 24. From FIG. 2 it will be apparent that, near the rear edge 33, the material of the plate 4 has a large number of notches 34 which, in this embodiment, are of triangular shape, in the outer face of the plate 4. The notches 34 are located directly side-by-side in a continuous row, which row covers the whole height of the rounded-off rear edge 33 of the plate 4. The horizontally measured dimension of each notch 34 is about one to two centimeters.

FIG. 2 and, in particular, FIG. 3 show that, between the rear of the plate 4 and the top part of the support 20 fastened by means of the bolts to the outer side of the carrying arm 15, is arranged a supporting element 35, which holds, during operation, the carrying arm 15, the support 20 and the roller 24 on the rear edge of the head partition 4. As shown in the elevational view of FIG. 2, the supporting element 35 has a substantially rectangular outer circumference and, as will be seen from FIG. 3, it is in contact with the outer side of the head partition 4 and the upper part of the support 20. The edge directed towards the head partition 4 has a row of adjacent notches fitting, during operation, between and on the notches 34 of the head partition 4. The supporting element 35 is fastened by a bolt 36 near the lower end of the part 18 of the carrying arm 15. The edge directed towards the upper part of the support 20 (FIG. 4) has a cavity 37 closely surrounding the neighboring head of one of the bolts 21. The bolt 36 extends through an open space between the edge 33 of the head partition 4 and a boundary face 38 of the upper part of the support 20 extending substantially parallel to the edge 33. In this open space also lies a projecting or bulging part 39 (FIG. 3) of the supporting element 35, said bulging part being integral with the material of the supporting element 35. The bulging part 39 has side faces directed towards the edge 33 and the boundary face 38, respectively, and is in substantially fitting engagement with said faces. The boundary face of the bulging part 39 that is directed towards the part 18 is located at a short distance from said plate part 18 so that, after the bolt 36 is tightened, the supporting element 35 and also the notches at the front bear forcibly on the outer faces of the head partition 4 (notches 34) and the support 20.

At the side of the row of notches 34, the outer face of the head partition 4 is provided with a dial 40 and the outer face of the supporting element 35 has a mark in the form of an arrow joining the dial 40.

The construction shown in the figures is illustrated for one of the two ends of the machine. At the other end of the machine the same construction is found in a symmetrically similar position.

During operation the machine is hitched by means of the trestle 5 to the three-point lifting device of a tractor moving the machine. The intermediate shaft 8 is connected with the power take-off shaft of the tractor and drives, through the driving mechanism 6, a gear wheel located near said mechanism inside the frame part 1 forming a gear box, said gear wheel, in turn, driving the further pairs of gear wheels in opposite directions. Thus, the tine carriers 12 and the pairs of tines 13 secured thereto are driven in pairs in opposite directions.

The situation illustrated in FIGS. 2 and 4 indicates a rest position of the machine in which the roller 24 is in its lowermost position relative to the pairs of tines 13. Prior to commencing operation, the two screw spindles 29 are manually turned so that, with respect to the frame part 1, the roller 24 is turned bodily upwardly, for example out of the position shown in FIG. 4, about the pivotal shafts 16 until the bottom of the roller, considered in a direction of height, is in the correct position relative to the pairs of tines 13 or, in other words, until the correct working depth of the tines 13 is attained, because the roller supports the machine on the ground surface. Since it must be possible separately to actuate the screw spindles 29, the bearings by which the roller 24 is journalled in the supports 20 are of an adjustable type.

During road transport, the legal provisions in various countries with respect to the maximum width of a machine, which should not exceed three meters or some different width, have to be observed. In order to ensure that this maximum width is, as far as possible, available for the deployment of the row of pairs of tines 13, said maximum width being an integral multiple of the desired spacing between the rotary axes of the soil cultivating members (about twenty-five centimeters), the outer faces of the two plate-shaped head partitions 4 are exactly disposed at a relative spacing of three meters so that no width has to be reserved for suspending the roller 24. The latter is achieved by arranging the carrying arms 15 of the supporting roller 24 on the inner side of each part 14 of each head partition 4 which projects upwardly above the top face of the frame part 1 and by arranging the spindles 29 and the associated structure on the same side of each part 14. By means in the inwardly bent-over parts 22 of the supports 20 arranged each on one side of the machine, it is ensured that the bearings of the supporting roller 24 lie just within the dimension 25 (FIG. 5) and do not protrude beyond the outer faces of the head partitions 4. In order to maximize the length of the roller, the rods 28 extend beyond the outermost partitions 27 over a short distance from the inner side faces of the upper parts of the supports 20.

During the displacement of the roller 24 in a direction of height by means of the spindles 29, the bolt 36 of the supporting element 35 is slightly loosened so that the notches of the supporting element 35 will no longer firmly bear in the notches 34 of the head partition 4. When the spindles 29 are turned, the supporting element 35 moves together with the carrying arm 15 and the support 20, the supporting element 35 maintaining its position shown since the cavity 37 holds the head of stop means comprising bolt 21. When the desired height has been attained, the bolt 36 on both sides of the machine is again tightened. During operation, the entire upwardly directed force exerted by the roller 24 on the remainder of the machine is transferred via the two supporting elements 35 to the head partition 4 and hence to the box-shaped frame part 1 so that the screw spindles 29 are not loaded. Through the head of the bolt 21 concerned, said force results in a moment on the bolt 36, which is absorbed on the side of the supporting element 35 remote from the bolt 21 since the notches of the supporting element 35 are pressed into the notches 34 and also because (FIG. 3) the side faces of the bulging part 39 directed towards the edge 33 and the boundary face 38, respectively, can engage the edge 33 and the boundary face 38, respectively. By this design of the supporting element 35 a simple transfer of forces is obtained.

The upwardly directed force exerted on the bottom of the supporting roller 24 is substantially equal to the overall weight of the machine and, as well as the acceleration forces produced during operation, is transferred via the parts 23 and 22 and the bolts 36 to the head partitions 4. Owing to the inward bends of the parts 22 of the support 20 an eccentric force (FIG. 5) is exerted on the carrying arm 15 with respect to the associated head partition 4. Owing to the symmetry of the construction, and to the load, the portion of the supporting part 23 located near the roller suspension is compelled to deform with respect to the frame part 1 in a vertical plane perpendicular to the length of the frame part 1, in which plane said portion is lying in the unloaded state. Owing to said, so to say, compulsory deformation, the upper part of the support 20 and the parts 18 and 19 of the carrying arm 15 will tend to bend outwardly, which would produce an undesirable load on the pivotal shaft 16 of the carrying arm 15 is located at the inner face of the part 14 of the head partition 4 which extends above the frame part 1, the carrying arm 15 is rigidly supported in the outward direction so that such undesirable load of the pivotal shaft 16 is avoided. The disposition of the carrying arm 15 on the inner side of the head partition 4 thus not only provides a geometrical advantage in optimalizing the relative positions of the soil cultivating members but also fulfils an important function in the simple pivotal disposition of the supporting roller 24.

The invention is not limited to the description and/or the claims, but also relates to the details disclosed in figures whether described or not.

What we claim as new and to be secured by Letters Patent of the United States is:

1. A soil cultivating machine comprising soil cultivating members driven to rotate about upwardly extending axes and carried by a gear box extending transversely of the intended direction of operative travel and a roller located behind the cultivating members, said roller being arranged by means of carrying arms on said gear box so as to be adjustable in a direction of height, at least one end of said gear box comprising an end plate which is provided with a part extending above said gear box, a carrying arm for said roller having a lever part which is pivotally arranged on the side of said end plate's part facing inboard and a support part to which said roller is journalled and which is rigidly connected to said lever part so as to be outboard thereof and generally adjacent in a spaced edge-to-edge relationship with said end plate, and a locking element arranged between said end plate and said support part where they are in said relationship so that they are rigidly and releasably fastened together in a selected relative disposition for the desired adjusted height of said cultivating members relative to said roller.

2. A soil cultivating machine as claimed in claim 1, wherein said carrying arm is fastened to said end plate and extends over said gear box and said end plate constitutes a head partition of said gear box.

3. A soil cultivating machine comprising soil cultivating members rotatably driven about upwardly extending axes and carried by a frame portion extending transversely of the intended direction of operative travel and a roller located behind said cultivating members, said roller being arranged on said frame portion by means of carrying arms so as to be adjustable in upwardly and downwardly directions, one side of a plate extending above said frame portion which is fastened thereto and extends substantially parallel to the machine's usual direction of travel and said upwardly and downwardly directions, said plate being a head partition of said frame portion, a screw spindle for the depth control of said roller relative to said cultivating members secured to said plate, one of said carrying arms pivotally arranged at said one side of said plate extending above said frame portion to said plate so as to be vertically adjustable relative thereto, said frame portion comprising a gear box and said partition being vertically disposed on an edge of said gear box in alignment with the implement's usual operating direction, at least part of said one arm and said screw spindle being located over said gear box, an upwardly extending edge of said partition having a rounded-off part, said rounded-off part being located at the rear edge of said partition with the entire height thereof forming an arc of a circle, the center of said arc lying on the longitudinal axis of a pivotal connection of said one arm to said plate, said edge having at its circumference a row of adjacent notches, and locking means arranged between said partition and said one arm for selectively locking said cultivating members at the depth relative to said roller established by said screw spindle and for selectively rigidly locking the position of said one arm relative to said plate.

4. A soil cultivating machine as claimed in claim 3, wherein said locking means comprises a supporting element is arranged between said head partition and said one carrying arm.

5. A soil cultivating machine as claimed in claim 4, comprising a bolt, wherein said supporting element extends parallel to said head partition and is bolted by said bolt to said one carrying arm.

6. A soil cultivating machine as claimed in claim 5, wherein an end part of said supporting element has notches which cooperate, during operation, with notches, which are provided in said head partition, the opposite end part of said supporting element bearing on an elevated part of said one carrying arm.

7. A soil cultivating machine comprising soil cultivating members rotatably driven about upwardly extending axes and carried by a frame portion extending transversely of the intended direction of operative travel and a roller located behind said cultivating members, said roller being arranged on said frame portion by means of carrying arms so as to be adjustable in upwardly and downwardly directions, one side of a plate extending above said frame portion which is fastened thereto and extends substantially parallel to the machine's usual direction of travel and said upwardly and downwardly directions, said plate being a head partition of said frame portion, a screw spindle for the depth control of said roller relative to said cultivating members secured to said plate, one of said carrying arms pivotally arranged at said one side of said plate extending above said frame portion to said plate so as to be vertically adjustable relative thereto, and locking means arranged between said partition and said one carrying arm for selectively locking said cultivating members at the depth relative to said roller established by said screw spindle, said locking member comprising a supporting element arranged between said partition and said one arm, said supporting element extending parallel to said partition and a bolt bolting said supporting element to said one arm, the end part of said supporting element having notches which cooperate, during operation, with notches which are provided in said partition, the opposite part of said supporting element bearing on an elevated part of said one arm.

8. A soil cultivating machine as claimed in claim 7, wherein said supporting element has boundary faces fitting between part of said rounded-off edge of the head partition and an edge of a raised part of said one carrying arm.

9. A soil cultivating machine as claimed in claim 8 wherein an end part of said supporting element has a cavity located at a distance from said bolt which receives stop means provided on said one carrying arm.

10. A soil cultivating machine comprising soil cultivating members driven to rotate about upwardly extending axes and carried by a frame portion extending transversely of the intended direction of operative travel, a roller located behind said cultivating members, said roller being arranged by means of carrying arms on said frame portion so as to be adjustable in a direction of height, one side of a plate extending above the frame portion being fastened to at least one end face of said frame portion in a plane substantially parallel to the direction of said height adjustment of said roller, and at least one of said carrying arms for said roller being pivotally arranged to the part of the side concerned of said plate extending above said frame portion, said plate comprising a head partition of said frame portion and a screw spindle for the depth control of the roller being secured thereto, a locking element being arranged between said partition and said one arm, said screw spindle being fastened to the side of said plate secured to said frame portion, an upwardly extending edge of said partition having a rounded-off part located at the rear edge thereof so that the entire height of said plate forms an arc of a circle, the center of said arc lying on the longitudinal axis of a pivotal shaft for said one arm, said edge of said head partition having at its circumference a row of adjacent notches and the end part of said locking element having further notches which cooperate during operation with said notches in said head partition while the opposite end part of said locking element is bearing on a downwardly extending support of said one arm.

11. A soil cultivating machine as claimed in claim 10 wherein at least part of said one carrying arm and said screw spindle are located above said frame portion.

12. A soil cultivating machine as claimed in claim 10 wherein said locking element has a bulging part fitting between part of said rounded-off edges of said head partition and an edge of said downwardly extending support of said one carrying arm.

13. A soil cultivating machine as claimed in claim 12 wherein said locking element extends substantially parallel to said head partition, a bolt bolting said locking element to said one carrying arm.

14. A soil cultivating machine as claimed in claim 13 wherein one of the end parts of said locking element has a cavity located at a distance from said bolt by means of which locking element is bolted to said one carrying arm, said cavity receiving a stop provided on said one carrying arm.

* * * * *